US012708150B2

(12) United States Patent
Lee et al.

(10) Patent No.: US 12,708,150 B2
(45) Date of Patent: Aug. 18, 2026

(54) AEROSOL GENERATING DEVICE

(71) Applicant: KT&G CORPORATION, Daejeon (KR)

(72) Inventors: Won Kyeong Lee, Gyeonggi-do (KR); Min Kyu Kim, Seoul (KR); Jung Ho Kim, Seoul (KR); Jong Sub Lee, Gyeonggi-do (KR); Hyung Seok Lee, Seoul (KR); Heon Jun Jeong, Seoul (KR)

(73) Assignee: KT&G Corporation, Daejeon (KR)

( * ) Notice: Subject to any disclaimer, the term of this patent is extended or adjusted under 35 U.S.C. 154(b) by 918 days.

(21) Appl. No.: 17/928,073

(22) PCT Filed: Aug. 4, 2022

(86) PCT No.: PCT/KR2022/011563
§ 371 (c)(1),
(2) Date: Feb. 9, 2023

(87) PCT Pub. No.: WO2023/014114
PCT Pub. Date: Feb. 9, 2023

(65) Prior Publication Data
US 2024/0225117 A1 Jul. 11, 2024

(30) Foreign Application Priority Data
Aug. 6, 2021 (KR) ........................ 10-2021-0104192

(51) Int. Cl.
*A24F 40/50* (2020.01)
*A24F 40/42* (2020.01)
(Continued)

(52) U.S. Cl.
CPC .............. *A24F 40/51* (2020.01); *A24F 40/42* (2020.01); *A24F 40/90* (2020.01); *B05B 17/0684* (2013.01)

(58) Field of Classification Search
CPC .......... A24F 40/40; A24F 40/42; A24F 40/51; A24F 40/90; B05B 17/0684;
(Continued)

(56) References Cited

U.S. PATENT DOCUMENTS

2015/0245658 A1 9/2015 Worm et al.
2018/0020731 A1* 1/2018 Rasmussen ............. A24F 40/50 131/329
(Continued)

FOREIGN PATENT DOCUMENTS

CN 102227175 A 10/2011
CN 104905411 A 9/2015
(Continued)

OTHER PUBLICATIONS

Office Action issued in Korean Application No. 10-2024-0069338 dated Jul. 1, 2024 (16 Pages).
(Continued)

*Primary Examiner* — Sang Y Paik
(74) *Attorney, Agent, or Firm* — Foley & Lardner LLP

(57) ABSTRACT

An aerosol generating device includes: a housing; a first printed circuit board arranged to extend along one surface of the housing; and a second printed circuit board arranged in the housing, and on which a processor configured to generate a control signal is mounted, the second printed circuit board extending in a direction crossing a direction in which the one surface of the housing extends.

12 Claims, 5 Drawing Sheets

(51) Int. Cl.

| | |
|---|---|
| ***A24F 40/51*** | (2020.01) |
| ***A24F 40/90*** | (2020.01) |
| ***B05B 17/06*** | (2006.01) |

(58) Field of Classification Search

CPC ..... B05B 7/0012; B05B 7/066; B06B 1/0238; B06B 1/20; B06B 2201/55; B06B 2201/77

USPC .......................................................... 392/386

See application file for complete search history.

(56) References Cited

U.S. PATENT DOCUMENTS

| | | | | |
|---|---|---|---|---|
| 2018/0297048 | A1 | 10/2018 | Ricketts et al. | |
| 2019/0191766 | A1 | 6/2019 | Zhang et al. | |
| 2020/0359695 | A1* | 11/2020 | Lim | H05K 1/0203 |
| 2021/0282464 | A1 | 9/2021 | Lamb et al. | |
| 2021/0345664 | A1 | 11/2021 | Liu et al. | |
| 2022/0183369 | A1* | 6/2022 | Blandino | A24F 40/57 |
| 2022/0248762 | A1* | 8/2022 | Hupkes | A24F 40/46 |
| 2022/0248768 | A1 | 8/2022 | Lee et al. | |
| 2022/0369707 | A1 | 11/2022 | Lee et al. | |
| 2023/0263235 | A1 | 8/2023 | Lord | |
| 2024/0225117 | A1 | 7/2024 | Lee et al. | |
| 2024/0268477 | A1 | 8/2024 | Liu | |

FOREIGN PATENT DOCUMENTS

| | | | |
|---|---|---|---|
| CN | 208875423 | U | 5/2019 |
| CN | 112135537 | A | 12/2020 |
| CN | 112165871 | A | 1/2021 |
| CN | 213096098 | U | 5/2021 |
| EP | 2 323 465 | A1 | 5/2011 |
| JP | 2017-506901 | A | 3/2017 |
| JP | 2020-531015 | A | 11/2020 |
| JP | 2021-35371 | A | 3/2021 |
| KR | 20-1998-0018860 | U | 7/1998 |
| KR | 10-2013-005119 | A | 5/2013 |
| KR | 2013/0052119 | A | 5/2013 |
| KR | 10-2020-0040028 | A | 4/2020 |
| KR | 10-2020-0144897 | A | 12/2020 |
| KR | 10-2673338 | B1 | 6/2024 |
| RU | 2689514 | C2 | 5/2019 |
| WO | 2020/057636 | A1 | 3/2020 |
| WO | 2020/182753 | A2 | 9/2020 |
| WO | WO-2021/023881 | A1 | 2/2021 |
| WO | 2021/145564 | A1 | 7/2021 |

OTHER PUBLICATIONS

Office Action issued in Korean Application No. 10-2024-0069338 dated Sep. 6, 2024 (9 Pages).

Office Action issued in Russian Application No. 2023124592/03(054094) dated Aug. 12, 2024 (12 Pages).

Written Opinion for PCT/KR2022/011563, dated Nov. 11, 2022.

International Search Report for PCT/KR2022/011563, dated Nov. 11, 2022.

Communication dated Jan. 2, 2024 issued by the Korean Patent Office in application No. 10-2021-0104192.

Extended European Search Report dated Oct. 9, 2023 in Application No. 22802484.0.

Japanese Office Action dated Nov. 27, 2023 in Application No. 2022-573612.

Canadian Office Action on CA Patent Application No. 3211212 dated Mar. 3, 2026.

Chinese Office Action on CN Patent Application No. 202280004504.3 dated Mar. 26, 2026.

* cited by examiner

[Fig. 1]
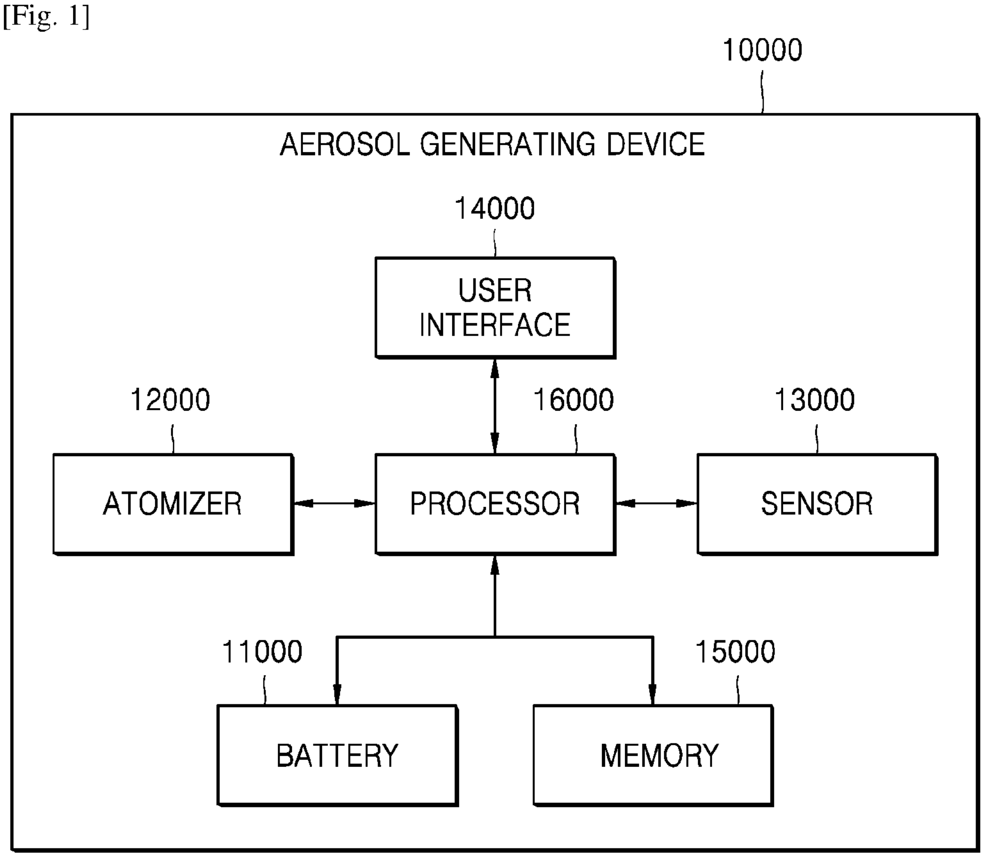

[Fig. 2]
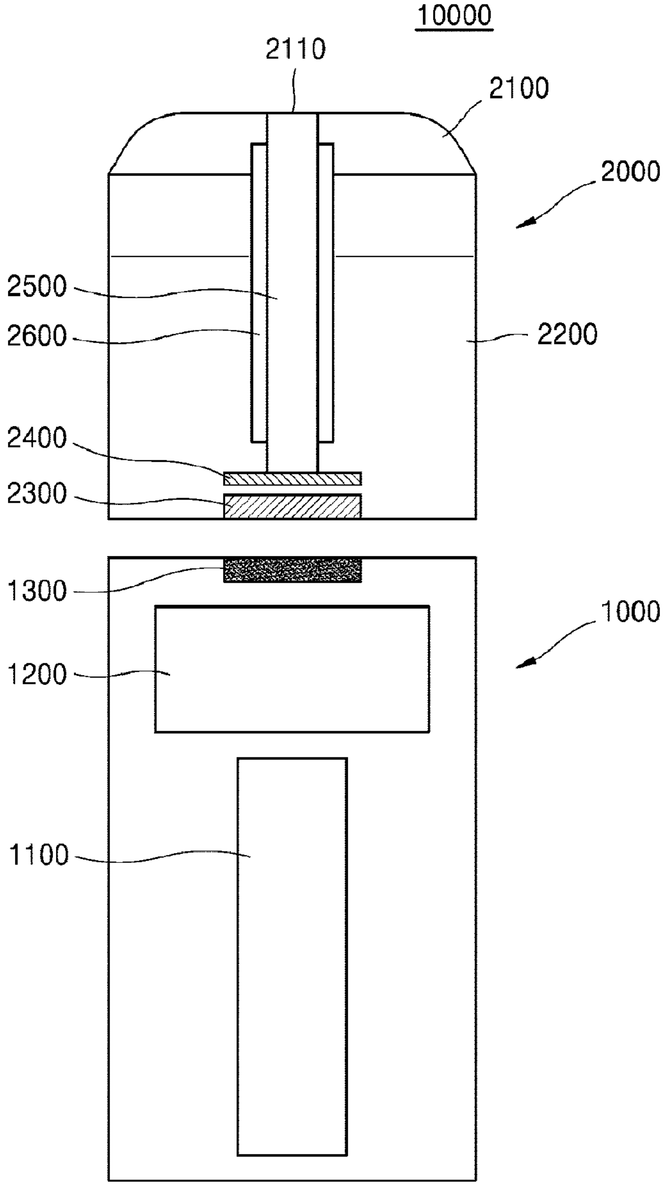
[Fig. 3]
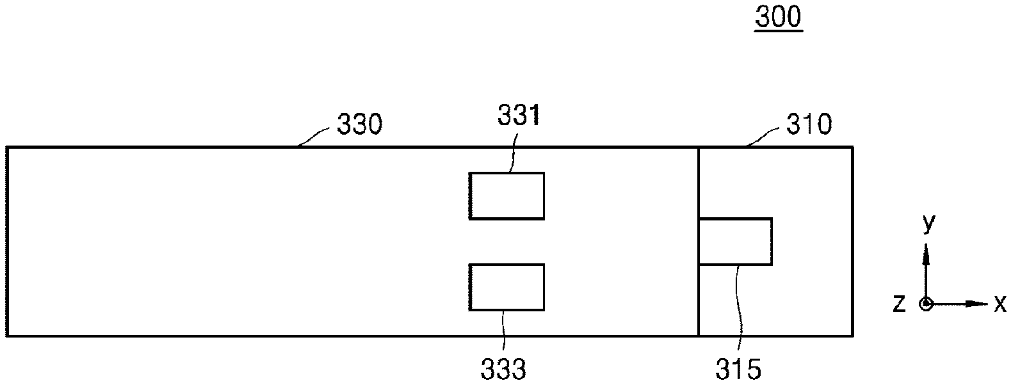

[Fig. 4]
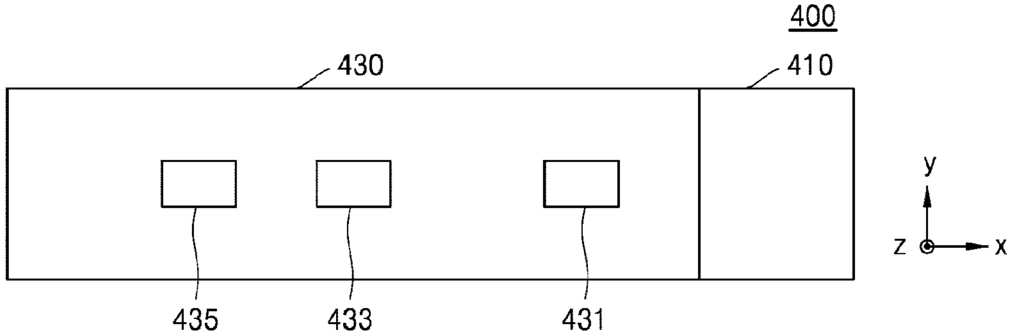
[Fig. 5]
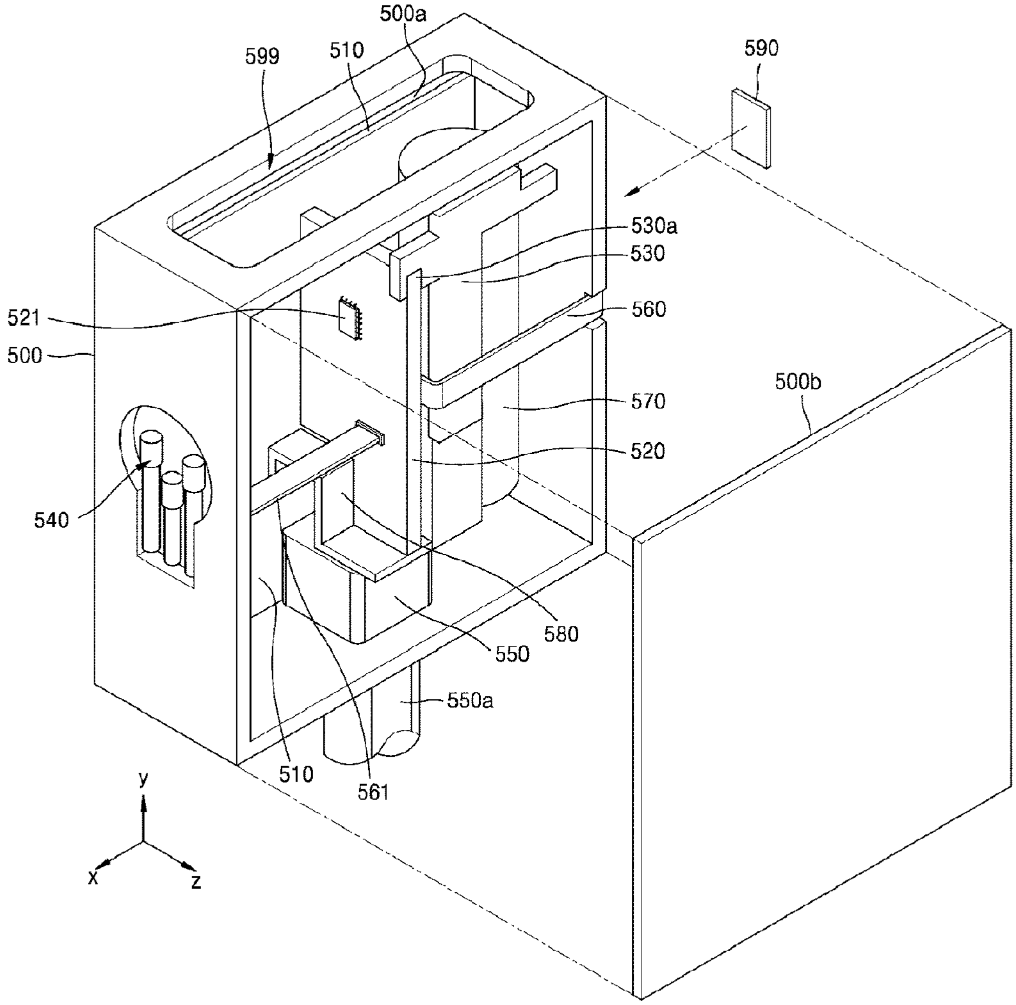

[Fig. 6]
[Fig. 7]
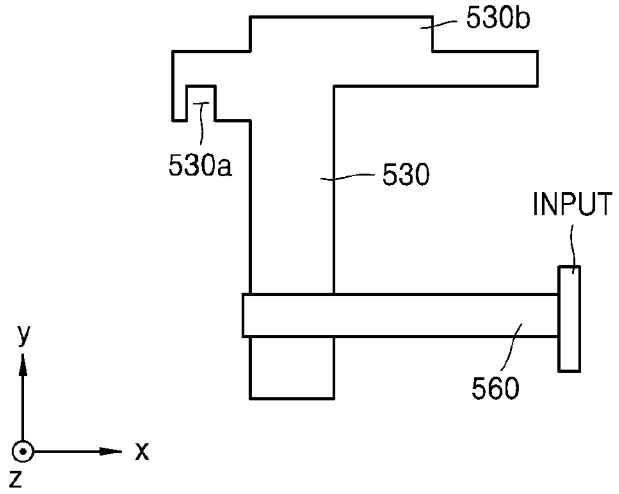

[Fig. 8]
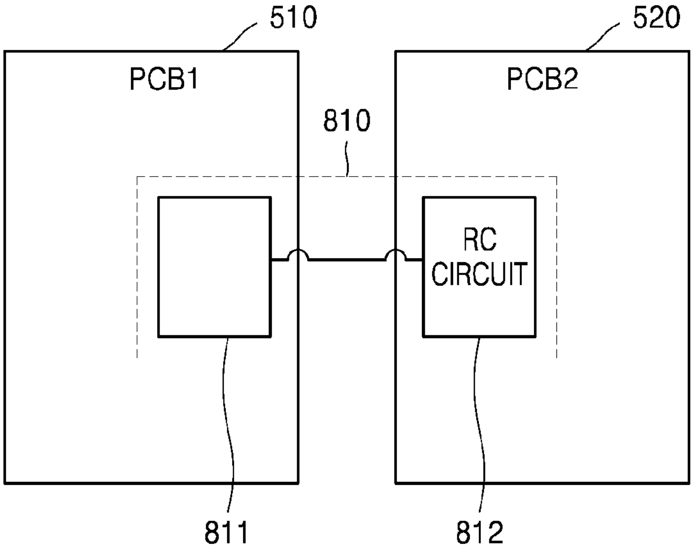

AEROSOL GENERATING DEVICE

CROSS REFERENCE TO RELATED APPLICATIONS

This application is a National Stage of International Application No. PCT/KR2022/011563 filed Aug. 4, 2022, claiming priority based on Korean Patent Application No. 10-2021-0104192 filed Aug. 6, 2021.

TECHNICAL FIELD

One or more embodiments relate to an aerosol generating device for generating an aerosol by using ultrasonic vibration.

BACKGROUND ART

Recently, the demand for an alternative to traditional combustive cigarettes has increased. For example, there is an increasing demand for an aerosol generating device that generates aerosols by heating an aerosol generating material, instead of combusting cigarettes. Accordingly, studies on a heating-type cigarette or a heating-type aerosol generating device have been actively conducted.

An aerosol generating device using ultrasonic vibration according to the related art generates an aerosol as a liquefied material is finely split due to ultrasonic vibration when the viscosity of the liquefied material touching an ultrasonic vibrator decreases due to the ultrasonic vibration by the ultrasonic vibrator to which an alternating current is applied. To atomize the liquefied material through ultrasonic vibration, a battery voltage has to be increased, and in this case, due to a high voltage, a high level of heat may occur in a device used in a circuit.

DISCLOSURE OF INVENTION

Technical Problem

The technical problem to be solved by embodiments is to provide an aerosol generating device with reduced internal heating.

Technical problems to be solved by the embodiments are not limited to the above-described problems, and problems that are not mentioned will be clearly understood by those of ordinary skill in the art from the present disclosure and the accompanying drawings.

Solution to Problem

An aerosol generating device according to embodiments includes: a housing; a first printed circuit board arranged to extend along one surface of the housing; and a second printed circuit board arranged in the housing, and on which a processor configured to generate a control signal is mounted, the second printed circuit board extending in a direction crossing a direction in which the one surface of the housing extends.

Advantageous Effects of Invention

According to embodiments, the number of printed circuit boards included in a main body may be increased to a plurality and various modules may be arranged in an optimized way based on the increased number of printed circuit boards, to prevent a phenomenon in which a temperature inside an aerosol generating device rises to an extremely high level that may cause a malfunction of a device having low thermal resistance.

The effects according to one or embodiments are not limited to the effects described above, and unmentioned effects will be clearly understood by one of ordinary skill in the art from the present specification and the accompanying drawings.

BRIEF DESCRIPTION OF DRAWINGS

FIG. 1 is a block diagram of an aerosol generating device according to an embodiment.

FIG. 2 is a schematic diagram of an aerosol generating device according to an embodiment.

FIG. 3 is an example of a view for describing temperatures of main devices of a printed circuit board (PCB), wherein the temperatures keep rising as puff operations are continually performed through an aerosol generating device.

FIG. 4 is another example of the view for describing temperatures of main devices of a PCB, wherein the temperatures keep rising as puff operations are continually performed through an aerosol generating device.

FIG. 5 is a schematic diagram of an internal structure of an aerosol generating device according to embodiments.

FIG. 6 is a view for describing an arrangement of a first printed circuit board and a second printed circuit board.

FIG. 7 is a view for describing, in detail, a bracket of FIG. 5.

FIG. 8 is a view of an example of a pressure sensor according to embodiments.

BEST MODE FOR CARRYING OUT THE INVENTION

An aerosol generating device according to embodiments includes: a housing; a first printed circuit board arranged to extend along one surface of the housing; and a second printed circuit board arranged in the housing, and on which a processor configured to generate a control signal is mounted, and which extends in a direction crossing a direction in which the one surface of the housing extends.

MODE FOR THE INVENTION

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and operation and can be implemented by hardware components or software components and combinations thereof.

As used herein, expressions such as “at least one of,” when preceding a list of elements, modify the entire list of elements and do not modify the individual elements of the list. For example, the expression, “at least one of a, b, and c,” should be understood as including only a, only b, only c, both a and b, both a and c, both b and c, or all of a, b, and c.

Hereinafter, the present disclosure will now be described more fully with reference to the accompanying drawings, in which exemplary embodiments of the present disclosure are shown such that one of ordinary skill in the art may easily work the present disclosure. However, the present disclosure may be embodied in many different forms and should not be construed as being limited to the embodiments set forth herein.

Terms such as “first” and “second” may be used to describe various components, but the components should not be limited by the terms. The terms are only used to dis-tinguish one component from another.

In addition, some of the components in the drawings may be illustrated with ex-aggerated sizes or proportions. In addition, the components shown in one figure may not be shown on another figure.

In addition, throughout the specification, the “longitudinal direction” of a component may be a direction in which the component extends along one axis of the component, and in this case, the one axis of the component may refer to a direction in which the component extends longer than the other axis transverse to the one axis.

Throughout the specification, the term “puff” refers to the user’s inhalation, and the inhalation may refer to a situation in which air is drawn into the user’s mouth, nasal cavity, or lungs through the user’s mouth or nose.

Since various embodiments described in the specification are classified arbitrarily only for the purpose of explanation, the embodiments should not be construed to be exclusive to each other. For example, some features disclosed in one embodiment may be applied to or implemented in other embodiments. In the present disclosure, a singular form also includes a plural form unless specifically stated in otherwise.

Hereinafter, the present disclosure will be described more fully with reference to the accompanying drawings, in which embodiments of the present disclosure are shown such that one of ordinary skill in the art may easily understand the present disclosure. However, the present disclosure may be embodied in many different forms and should not be con-strued as being limited to the embodiments set forth herein.

FIG. 1 is a block diagram of an aerosol generating device according to an embodiment.

Referring to FIG. 1, an aerosol generating device 10000 may include a battery 11000, an atomizer 12000, a sensor 13000, a user interface 14000, a memory 15000, and a processor 16000. However, the aerosol generating device 10000 is not limited to the embodiment shown in FIG. 1. Depending on the design of the aerosol generating device 10000, it may be understood by those of ordinary skill in the art that some of the hardware components shown in FIG. 1 may be omitted or other components may be further added.

As an example, the aerosol generating device 10000 may include a body, and in this case the hardware elements included in the aerosol generating device 10000 are located in a main body.

As another embodiment, the aerosol generating device 10000 may include a main body and a cartridge, and hardware elements included in the aerosol generating device 10000 may be divided and located in the main body and the cartridge. Alternatively or additionally, at least some of the hardware elements included in the aerosol generating device 10000 may be located in each of the main body and the cartridge.

Hereinafter, the operation of each element is described without any spatial limitation on each element included in the aerosol generating device 10000.

The battery 11000 supplies power to be used to operate the aerosol generating device 10000. That is, the battery 11000 may supply power to enable the atomizer 12000 to atomize the aerosol generating material. In addition, the battery 11000 may supply power for the operation of other hardware elements included in the aerosol generating device 10000, that is, the sensor 13000, the user interface 14000, the memory 15000, and the processor 16000. The battery 11000 may be a rechargeable battery or a disposable battery.

For example, the battery 11000 may include a nickel-based battery (e.g., a nickel-metal hydride battery, a nickel-cadmium battery), or a lithium-based battery (e.g., a lithium-cobalt battery, a lithium-phosphate battery, a lithium titanate battery, a lithium-ion battery, or a lithium-polymer battery). However, the types of the battery 11000 used in the aerosol generating device 10000 are not limited thereto. For example, the battery 11000 may also include an alkaline battery or a manganese battery.

The atomizer 12000 receives power from the battery 11000 under the control of the processor 16000. The atom-izer 12000 may receive power from the battery 11000 to atomize the aerosol generating material stored in the aerosol generating device 10000.

The atomizer 12000 may be located in the main body of the aerosol generating device 10000. Alternatively, when the aerosol generating device 10000 includes the main body and the cartridge, the atomizer 12000 may be located in one of the cartridge and the main body, or may extend from the main body to the cartridge or vice versa. When the atomizer 12000 is located in the cartridge, the atomizer 12000 may receive power from the battery 11000 located in at least one of the main body and the cartridge. In addition, when the atomizer 12000 is divided and located in the main body and the cartridge, components that require power supply in the atomizer 12000 may receive power from the battery 11000 located in at least one of the main body and the cartridge.

The atomizer 12000 generates an aerosol from the aerosol generating material inside the cartridge. The aerosol may mean a suspension in which liquid and/or solid fine particles are dispersed in a gas. That is, the aerosol generated from the atomizer 12000 may be in a state in which vaporized particles generated from the aerosol generating material and air are mixed. For example, the atomizer 12000 may convert a phase of the aerosol generating material into a gas phase through vaporization and/or sub-limation. The atomizer 12000 may also generate an aerosol by finely emitting an aerosol generating material in a liquid and/or solid phase.

For example, the atomizer 12000 may generate an aerosol from the aerosol generating material by using an ultrasonic vibration method. The ultrasonic vibration method may refer to a method of generating an aerosol by atomizing an aerosol generating material with ultrasonic vibration generated by a vibrator.

Although not shown in FIG. 1, the atomizer 12000 may include a heater capable of heating the aerosol generating material by generating heat. The aerosol generating material may be heated by the heater, resulting in the generation of the aerosol.

The heater may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, nichrome, and the like, but is not limited thereto. In addition, the heater may be implemented as a metal heating wire, a metal heating plate on which an electrically conductive track is arranged, a ceramic heating element, and the like, but is not limited thereto.

For example, in one embodiment, the heater may be a part of the cartridge 2000. Also, the cartridge 2000 may include liquid delivery unit and a liquid storage unit, which are described later. The aerosol producing material accommodated in the liquid storage unit is moved to the liquid delivery unit, and the heater may heat the aerosol generating material absorbed by the liquid delivery unit to generate an aerosol. For example, the heater may be wound around the liquid delivery unit or arranged adjacent the liquid delivery unit.

As another example, the aerosol generating device 10000 may include an accommodation space capable of accommodating a cigarette, and the heater may heat the cigarette inserted into the accommodation space of the aerosol generating device 10000. As the cigarette is accommodated in the accommodation space of the aerosol generating device 10000, the heater may be inside and/or outside the cigarette. Thus, the heater may heat the aerosol generating material in the cigarette to generate an aerosol.

On the other hand, the heater may be an induction heating type heater. The heater may include an electrically-conductive coil for heating cigarette or cartridge in an induction heating manner, and the cigarette or cartridge may include a susceptor that may be heated by the induction heating type heater.

The aerosol generating device 10000 may include at least one sensor 13000. A result sensed by the at least one sensor 13000 may be transmitted to the processor 16000, and depending on the sensing result, the processor 16000 may control the aerosol generating device 10000 to perform various functions such as operation control of the atomizer 12000, restriction of smoking, determination of whether cartridge (or cigarette) is inserted or not, display of a notification, and the like.

For example, at least one sensor 13000 may include a puff detection sensor. The puff detection sensor may detect the user's puff based on at least one of a change in a flow rate of an externally introduced air flow, a change in pressure, and a detection of a sound. The puff detection sensor may detect a start time and an end time of the user's puff, and the processor 16000 may determine a puff period and a non-puff period depending on the detected start time and the detected end time of the puff.

Also, the at least one sensor 13000 may include a user input sensor. The user input sensor may be a sensor capable of receiving a user input, such as a switch, a physical button, or a touch sensor. For example, when a user touches a predetermined area formed of a metal material, a change in capacitance occurs, and the touch sensor may be a capacitive sensor capable of detecting a user's input by detecting the change in capacitance. The processor 16000 may determine whether a user's input has occurred by comparing the value before and after the change of the capacitance received from the capacitive sensor. When the value before and after the change of capacitance exceeds a preset threshold, the processor 16000 may determine that the user's input has occurred.

Also, the at least one sensor 13000 may include a motion sensor. Information about the movement of the aerosol generating device 10000, such as inclination, moving speed, and acceleration of the aerosol generating device 10000, may be acquired through the motion sensor. For example, the motion sensor may measure information about a state in which the aerosol generating device 10000 moves, a stationary state of the aerosol generating device 10000, a state in which the aerosol generating device 10000 is inclined at an angle within a predetermined range for the puff, and an angle of the aerosol generating device 10000 between each puff motion. The motion sensor may measure motion information of the aerosol generating device 10000 using various methods. For example, the motion sensor may include an acceleration sensor capable of measuring acceleration in three directions, an x-axis, a y-axis, and a z-axis, and a gyro sensor capable of measuring angular velocity in the three directions.

Also, the at least one sensor 13000 may include a proximity sensor. The proximity sensor refers to a sensor that detects an approaching object, or the presence or distance of an object existing in the vicinity without mechanical contact and using the force of an electromagnetic field or infrared rays, etc. The proximity sensor may detect whether the user approaches the aerosol generating device 10000.

Also, the at least one sensor 13000 may include an image sensor. The image sensor may include, for example, a camera for obtaining an image of an object. The image sensor may recognize an object based on the image obtained by the camera. The processor 16000 may analyze the image obtained through the image sensor to determine whether the user is in a situation to use the aerosol generating device 10000. For example, when the user approaches the aerosol generating device 10000 near the lips of the user to use the aerosol generating device 10000, the image sensor may obtain an image of the lips. The processor 16000 may analyze the obtained image, and determine that the user is in a situation to use the aerosol generating device 10000 when the obtained image is determined as the lips. Based on this determination, the aerosol generating device 10000 may operate the atomizer 12000 in advance or preheat the heater.

In addition, the at least one sensor 13000 may include a consumable detachment sensor capable of detecting installation or removal of consumables (e.g., cartridge, cigarette, etc.) that may be used in the aerosol generating device 10000. For example, the consumable detachment sensor may detect whether the consumable has been in contact with the aerosol generating device 10000 or may determine whether the consumable is detached by the image sensor. In addition, the consumable detachment sensor may be an inductance sensor that detects a change in an inductance value of a coil that may interact with a marker of the consumable, or may be a capacitance sensor that detects a change in the capacitance value of the capacitor that may interact with the marker of the consumable.

In addition, the at least one sensor 13000 may include a temperature sensor. The temperature sensor may sense the temperature at which the heater (or the aerosol generating material) of the atomizer 12000 is heated. The aerosol generating device 10000 may include a temperature sensor for sensing the temperature of the heater, or the heater itself may serve as the temperature sensor. Alternatively or additionally, a separate temperature sensor may be further included in the aerosol generating device 10000 when the heater itself functions as a temperature sensor. In addition, the temperature sensor may sense the temperature of internal components such as a printed circuit board (PCB) and a battery of the aerosol generating device 10000 as well as the heater.

In addition, the at least one sensor 13000 may include various sensors that measure information on the surrounding environment of the aerosol generating device 10000. For example, the at least one sensor 13000 may include a temperature sensor that may measure the temperature of the surrounding environment, a humidity sensor that measures the humidity of the surrounding environment, and an atmospheric pressure sensor that measures the pressure of the surrounding environment.

The sensor 13000 that may be provided in the aerosol generating device 10000 is not limited to the above-described types, and may further include various sensors. For example, the aerosol generating device 10000 may include a fingerprint sensor capable of obtaining fingerprint information from a user's finger for user authentication and security, an iris recognition sensor for analyzing the iris pattern of the pupil, a vein recognition sensor that detects the amount of infrared absorption of reduced hemoglobin in veins from images taken from the palm, a facial recognition sensor that recognizes feature points such as eyes, nose, mouth and facial contours in 2D or 3D manner, and radio-frequency identification (RFID) sensor.

In the aerosol generating device 10000, only one or some of the examples of the various sensors 13000 provided above may be selected and implemented. In other words, the aerosol generating device 10000 may combine and utilize information sensed by at least one of the above-described sensors.

The user interface 14000 may provide the user with information about the state of the aerosol generating device 10000. The user interface 14000 may include various interfacing means such as a display or lamp for outputting visual information, a motor for outputting tactile information, a speaker for outputting sound information, terminals for data communication with input/output (I/O) interfacing means (e.g., button or touch screen) which receives information input from a user or outputs information to a user, or for receiving charging power, and communication interfacing module for performing wireless communication with external devices (e.g., Wi-Fi, Wi-Fi direct, Bluetooth, Near-Field Communication (NFC), etc.).

However, in the aerosol generating device 10000, only one or some of the various user interface 14000 examples provided above may be selected and implemented.

The memory 15000 is hardware for storing various data processed in the aerosol generating device 10000, and may store data processed and data to be processed by the processor 16000. The memory 15000 may be implemented in various types such as random access memory (RAM) including dynamic random access memory (DRAM) and static random access memory (SRAM), read-only memory (ROM), and electrically erasable programmable read-only memory (EEPROM).

The memory 15000 may store the operating time of the aerosol generating device 10000, a maximum number of puffs, a current number of puffs, at least one temperature profile, and data on the user's smoking pattern.

The processor 16000 controls the overall operation of the aerosol generating device 10000. The processor 16000 may be implemented as an array of a plurality of logic gates, or may be implemented as a combination of a general-purpose microprocessor and a memory in which a program executable by the microprocessor is stored. In addition, it may be understood by those skilled in the art that the processor 16000 may be implemented with other types of hardware.

The processor 16000 analyzes the result sensed by the at least one sensor 13000 and controls processes to be subsequently performed.

The processor 16000 may control power supply to the atomizer 12000 to start or end the operation of the atomizer 12000 based on the result sensed by the at least one sensor 13000. In addition, the processor 16000 may control the amount of power supplied to the atomizer 12000 and the time at which the power is supplied so that the atomizer 12000 may generate an appropriate amount of aerosol, based on the result sensed by the at least one sensor 13000. For example, the processor 16000 may control the electrical energy (e.g., current or voltage) supplied to the vibrator so that the vibrator of the atomizer 12000 vibrates at a predetermined frequency.

In one embodiment, the processor 16000 may start the operation of the atomizer 12000 after receiving a user input for the aerosol generating device 10000. In addition, the processor 16000 may start the operation of the atomizer 12000 after detecting the user's puff using the puff detection sensor. Further, after counting the number of puffs using the puff detection sensor, the processor 16000 may stop supplying power to the atomizer 12000 when the number of puffs reaches a preset number.

The processor 16000 may control the user interface 14000 based on a result sensed by the at least one sensor 13000. For example, after counting the number of puffs using the puff detection sensor, when the number of puffs reaches the preset number, the processor 16000 may use at least one of a lamp, a motor, and a speaker to inform the user that the aerosol generating device 10000 will be terminated soon.

On the other hand, although not shown in FIG. 1, the aerosol generating device 10000 may be included in the aerosol generating system together with a separate cradle. For example, the cradle may be used to charge the battery 11000 of the aerosol generating device 10000. For example, the aerosol generating device 10000 may receive power from the battery of the cradle and charge the battery 11000 of the aerosol generating device 10000 while being accommodated in the accommodating space inside the cradle.

The one or more embodiments may also be implemented in the form of a recording medium including instructions executable by a computer, such as a program module executable by a computer. A computer-readable medium may be any available media that may be accessed by a computer and includes both volatile and nonvolatile media, and removable and non-removable media. In addition, the computer-readable medium may include a computer storage medium and a communication medium. The computer storage includes both volatile and nonvolatile, and removable and non-removable media implemented in any method or technology for storage of information such as computer readable instructions, data structures, program modules or other data. Communication medium may include computer readable instructions, data structures, other data in non-transitory data signals, such as program modules.

FIG. 2 is a diagram schematically illustrating an aerosol generating device according to an embodiment.

An aerosol generating device 10000 according to the embodiment shown in FIG. 2 includes a cartridge 2000 including an aerosol generating material, and a main body 1000 supporting the cartridge 2000.

The cartridge 2000 may be coupled to the main body 1000 in a state in which the aerosol generating material is accommodated therein. For example, a portion of the cartridge 2000 may be inserted into the main body 1000, or a portion of the main body 1000 may be inserted into the cartridge 2000, such that the cartridge 2000 may be mounted on the main body 1000. In this case, the main body 1000 may maintain a state coupled to the cartridge 2000 by a snap-fit method, a screw coupling method, a magnetic coupling method, an interference fit method, etc., but the method in which the main body 1000 is coupled to the cartridge 2000 is not limited to the above description.

The cartridge 2000 may include a mouthpiece 2100. The mouthpiece 2100 may be formed on a side opposite to a portion coupled to the main body 1000, and may be a portion inserted into the user's oral cavity. The mouthpiece 2100 may include a discharge hole 2110 for discharging the aerosol generated from the aerosol generating material inside the cartridge 2000 to the outside.

The cartridge 2000 may hold an aerosol-generating material having any one state, such as a liquid state, a solid state, a gaseous state, or a gel state, for example. The aerosol generating material may include a liquid composition. For example, the liquid composition may be a liquid including a tobacco-containing material including a volatile tobacco flavor component, or may be a liquid including a non-tobacco material.

The liquid composition may include, for example, any one of water, a solvent, ethanol, a plant extract, spices, a flavoring, and a vitamin mixture, or a mixture thereof. The spices may include menthol, peppermint, spearmint oil, various fruit flavoring in-gredients, and the like, but are not limited thereto. The flavorings may include in-gredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may include any weight ratio of glycerin and propylene glycol solution to which nicotine salts are added. The liquid composition may include two or more types of nicotine salts. The nicotine salts may be formed by adding acids including organic or inorganic acids, to nicotine. Nicotine may be a naturally generated nicotine or synthetic nicotine, and may have any weight con-centration relative to the total solution weight of the liquid composition.

The acid for the formation of the nicotine salt may be appropriately selected in consideration of the blood nicotine absorption rate, the operating temperature of the aerosol generating device 10000, flavors or tastes, solubility, and the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The cartridge 2000 may include a liquid storage unit 2200 for accommodating an aerosol generating material therein. The liquid storage unit 2200 accommodating the aerosol generating material may mean that the liquid storage unit 2200 performs a function of containing the aerosol generating material, such as a container, and the liquid storage unit 2200 may include an element impregnating (or containing) the aerosol generating material such as, for example, sponges, cotton or cloth, or porous ceramic structures therein.

The aerosol generating material stored in the liquid storage 2000 is a liquid. According to an embodiment, the aerosol generating material may be in the form of gel, and according to a phase of the aerosol generating material, the liquid storage 2000 may also be referred to as a storage.

The aerosol generating device 10000 may include an atomizer that converts the phase of the aerosol generating material inside the cartridge 2000 to generate an aerosol.

For example, the atomizer of the aerosol generating device 10000 may convert the phase of the aerosol generating material by using an ultrasonic vibration method of atomizing the aerosol generating material with ultrasonic vibration. The atomizer may include a vibrator 1300 that generates ultrasonic vibrations, a liquid delivery unit 2400 that absorbs the aerosol generating material and maintains the absorbed aerosol generating material in an optimal state for converting into an aerosol, and a vibration accommodating unit 2300 for generating an aerosol by transmitting ultrasonic vibrations to the aerosol generating material of the liquid delivery unit.

The vibrator 1300 may generate vibration for a short period. The vibration generated by the vibrator 1300 may be ultrasonic vibration, and the frequency of the ultrasonic vibration may be, for example, 100 kHz to 3.5 MHz. By the short-period vibration generated from the vibrator 1300, the aerosol generating material may be vaporized and/or atomized into an aerosol.

The vibrator 1300 may include, for example, piezoelectric ceramics, and the piezoelectric ceramics are functional materials that may convert electricity to mechanical forces by generating electricity (voltage) by physical force (pressure) and generating vibration (mechanical force) when electricity is applied. Therefore, the vibration (physical force) is generated by the electricity applied to the vibrator 1300, and such small physical vibrations may split the aerosol generating material into small particles and atomize the aerosol generating material into an aerosol.

The vibrator 1300 may be electrically connected to a circuit by a pogo pin or a C-clip. Accordingly, the vibrator 1300 may generate vibration by receiving a current or voltage from the pogo pin or the C-clip. However, the type of element connected to supply current or voltage to the vibrator 1300 is not limited to the above description.

The vibration accommodating unit 2300 may receive the vibration generated from the vibrator 1300 and convert the aerosol generating material transmitted from the liquid storage unit 2200 into an aerosol.

The liquid transfer unit 2400 may transfer the liquid composition of the liquid storage unit 2200 to the vibration accommodating unit 2300. For example, the liquid delivery unit 2400 may be a wick including at least one of cotton fiber, ceramic fiber, glass fiber, and porous ceramic, but is not limited thereto.

According to another embodiment, the liquid transfer device 2400 may also be referred to as a material transfer portion, when the aerosol generating material is not in a liquid state.

The atomizer may also be implemented as a mesh or plate-shaped vibration accommodating unit that performs both a function of absorbing and maintaining the aerosol generating material in an optimal state for conversion into an aerosol without using a separate liquid transfer means and a function of generating an aerosol by transmitting vibration to the aerosol generating material.

In addition, in the embodiment shown in FIG. 2, the vibrator 1300 of the atomizer is arranged in the main body 1000, and the vibration accommodating unit 2300 and the liquid delivery unit 2400 are arranged in the cartridge 2000, but is not limited thereto.

For example, the cartridge 2000 may include the vibrator 1300, the vibration accommodating portion 2300, and a liquid delivery unit 2400, and when a portion of the cartridge 2000 is inserted into the main body 1000, the main body 1000 may provide power to the cartridge 2000 through a terminal (not shown) or supply a signal related to the operation of the cartridge 2000 to the cartridge 2000, through which the operation of the vibrator 1300 may be controlled.

Also, according to an embodiment, the vibration receiver 2300 may be omitted in the aerosol generating device 10000 according to embodiments. In this case, the cartridge 2000 may include the vibrator 1300, the liquid storage 2200, and the liquid transfer device 2400. Since the aerosol generating device 10000 according to the embodiment described above may not include the vibration receiver 2300, the aerosol generating device 10000 may be differently realized from the aerosol generating device 10000 illustrated in FIG. 2, and vibration generated by the vibrator 1300 may be directly transferred to an aerosol generating material (a liquid) in the liquid transfer device 2400.

The liquid storage unit 2200 of the cartridge 2000 may include a transparent material at least in part so that the aerosol generating material accommodated in the cartridge 2000 may be visually seen from the outside. The mouthpiece 2100 and the liquid storage unit 2200 may be entirely made of transparent plastic or glass, and only a portion of the liquid storage unit 2200 may be made of a transparent material.

The cartridge 2000 of the aerosol generating device 10000 may include an aerosol discharge passage 2500 and an airflow passage 2600.

The aerosol discharge passage 2500 may be formed in the liquid storage unit 2200 to be in fluid communication with the discharge hole 2110 of the mouthpiece 2100. Therefore, the aerosol generated by the atomizer may move along the aerosol discharge passage 2500, and may be delivered to the user through the discharge hole 2110 of the mouthpiece 2100.

The airflow passage 2600 is a passage through which external air may be introduced into the aerosol generating device 10000. The external air introduced through the airflow passage 2600 may be introduced into the aerosol discharge passage 2500 or may be introduced into a space in which an aerosol is generated. Accordingly, the introduced external air may be mixed with vaporized particles generated from the aerosol generating material to generate an aerosol.

For example, as shown in FIG. 2, the airflow passage 2600 may be formed to surround the outside of the aerosol discharge passage 2500. Therefore, the shape of the aerosol discharge passage 2500 and the air flow passage 2600 may be a double tube type in which the aerosol discharge passage 2500 is arranged inside and the air flow passage 2600 is arranged outside of the aerosol discharge passage 2500. Thus, the external air may be introduced in the direction opposite to the direction in which the aerosol moves in the aerosol discharge passage 2500.

However, the structure of the airflow passage 2600 is not limited to the above description. For example, the airflow passage may be a space formed between the main body 1000 and the cartridge 2000 when the main body 1000 and the cartridge 2000 are combined and in fluid communication with the atomizer.

In the aerosol generating device 10000 according to the above-described embodiment, a cross-sectional shape in a direction transverse to the longitudinal direction of the main body 1000 and the cartridge 2000 may be an approximately circular, oval, square, rectangular, or polygonal cross-sectional shape of various shapes. However, the cross-sectional shape of the aerosol generating device 10000 is not limited to the above description, and the aerosol generating device 10000 is not necessarily limited to a structure extending in a straight line when extending in the longitudinal direction. For example, the cross-sectional shape of the aerosol generating device 10000 may be curved in a streamline shape for a user to easily hold by hand or be bent at a predetermined angle in a specific area and extending long, and the cross-sectional shape of the aerosol generating device 10000 may change along the longitudinal direction.

FIG. 3 is an example of a view for describing temperatures of main devices of a PCB, wherein the temperatures keep rising as puff operations are continually performed through an aerosol generating device.

In more detail, FIG. 3 is a schematic view of some components of an aerosol generating device 300, in which a cartridge 310 and a main body 330 are coupled to each other. The aerosol generating device of FIG. 3 includes each of the cartridge 310 and the main body 330. The cartridge 310 includes a first temperature measuring portion 315, and the main body 330 includes each of a second temperature measuring portion 331 and a third temperature measuring portion 333. It is regarded that the aerosol generating device 300, the cartridge 310, and the main body 330 of FIG. 3 correspond to the aerosol generating device 10000, the cartridge 2000, and the main body 1000 of FIG. 2, respectively.

In FIG. 3, the first temperature measuring portion 315, the second temperature measuring portion 331, and the third temperature measuring portion 333 are entitled to clearly refer to locations of the aerosol generating device 300, at which temperatures are measured, and they do not denote specific modules detachable from the aerosol generating device 300.

Also, specific modules may be located in the first through third temperature measuring portions 315, 331, and 333. For example, when the aerosol generating device 300 is an ultrasonic vibration aerosol generating device, a vibration receiver configured to receive vibration from an ultrasonic vibrator of the main body 330 and vibrate a liquid substrate may be arranged in the first temperature measuring portion 315, and the second temperature measuring portion 331 and the third temperature measuring portion 333 may correspond locations of a PCB, on which a field-effect transistor (FET) configured to perform a switch function for supplying power is mounted.

In detail, the first temperature measuring portion 315 denotes a location adjacent to a coupling portion at which the cartridge 310 and the main body 330 are coupled to each other. When a user turns on the aerosol generating device 300 and keeps puffing, a temperature of the first temperature measuring portion 315 may rise from 31.6° C. to 108.0° C. Here, an end time point of a smoking session of the aerosol generating device 300 may be after 14 puff operations are completed or after 4.30 minutes passed after a puff operation is started.

The second and third temperature measuring portions 331 and 333 may denote two locations biased in a positive direction of an x axis from a center of the PCB included in the main body 330. As illustrated in FIG. 3, when the second temperature measuring portion 331 and the third temperature measuring portion 333 are indicated by three-dimensional spatial coordinates, the second and third temperature measuring portions 331 and 333 may have the same x axis coordinate value, and only y axis coordinate values may be different from each other. As described above for example, the FET configured to perform the switch function based on an electrical signal and engage in the supplying of power may be arranged in the second and third temperature measuring portions 331 and 333.

TABLE 1

| | Temperature | | |
|---|---|---|---|
| The number of puff operations | 315 First temperature measuring portion | 331 Second temperature measuring portion | 333 Third temperature measuring portion |
| 1 | 31.6 | 47.3 | 49.4 |
| 2 | 35.8 | 53.1 | 54.8 |
| 3 | 42.8 | 60.6 | 62.0 |
| 4 | 50.4 | 63.3 | 65.4 |
| 5 | 56.8 | 67.3 | 67.4 |
| 6 | 63.2 | 71.2 | 70.2 |
| 7 | 69.6 | 75.4 | 74.4 |
| 8 | 76.5 | 79.1 | 77.2 |
| 9 | 82.0 | 86.3 | 82.6 |
| 10 | 87.8 | 84.4 | 80.7 |
| 11 | 94.2 | 83.1 | 78.4 |
| 12 | 98.8 | 77.0 | 72.7 |
| 13 | 104.0 | 78.6 | 73.9 |
| 14 | 108.0 | 81.7 | 76.5 |

Table 1 shows temperature values of the first through third temperature measuring portions 315, 331, and 333, wherein the temperature values are changed as puff operations are continually performed in FIG. 3. Referring to Table 1, it is shown that the first temperature measuring portion 315 may have a temperature rising up to 108° C. as the puff operations continue, the second temperature measuring portion 331 may have a temperature rising up to 86.3 °C, and the third temperature measuring portion 333 may have a temperature rising up to 82.6° C.

To interpret Table 1 assuming that the aerosol generating device 300 is the ultrasonic vibration aerosol generating device, a temperature rise speed of the first temperature measuring portion 315, in which the vibration receiver configured to heat a liquid substrate of the cartridge 310 by receiving vibration of the ultrasonic vibrator, is located, is the highest, and temperature rise speeds of the second temperature measuring portion 331 and the third temperature measuring portion 333 that are relatively apart from the location of the ultrasonic vibrator or the vibration receiver by a predetermined distance are relatively low.

Also, referring to Table 1, the second temperature measuring portion 331 and the third temperature measuring portion 333 are apart from the first temperature measuring portion 315 by the same distance of the x axis. However, it is shown that the temperature rise speeds of the second and third temperature measuring portions 331 and 333 are different from each other due to effects of ambient devices mounted on the PCB of the main body 330.

There may be a sensor (module) performing a malfunction at around 100° C., from among sensors (modules) mounted on the PCB of the aerosol generating device or not directly mounted on the PCB and electrically connected to the PCB. For example, a recommended temperature range of some models of a pressure sensor configured to sense a pressure change in a device is between −40° C. and 85° C., and this pressure sensor may perform a malfunction when an internal temperature of the aerosol generating device 300 exceeds 85° C. or rises near to 85° C. as illustrated in Table 1. The temperature values and the temperature range described above are example numerical values. The temperature values and the temperature range may vary according to the type of used sensor or a sensor model number and are not limited to a predetermined value or range.

FIG. 4 is another example of a view for describing temperatures of main devices of a PCB, wherein the temperatures keep rising as puff operations are continually performed through an aerosol generating device.

In more detail, FIG. 4 is a schematic view of some components of an aerosol generating device 400, in which a cartridge 410 and a main body 430 are coupled to each other. The aerosol generating device 400 of FIG. 4 includes each of the cartridge 410 and the main body 430, and the main body 430 includes each of a fourth temperature measuring portion 431, a fifth temperature measuring portion 433, and a sixth temperature measuring portion 435. It is regarded that the aerosol generating device 400, the cartridge 410, and the main body 430 of FIG. 4 correspond to the aerosol generating device 10000, the cartridge 2000, and the main body 1000 of FIG. 2, respectively.

In FIG. 4, the fourth through sixth temperature measuring portions 431, 433, and 435 are entitled to clearly refer to locations of the aerosol generating device 400, at which temperatures are measured, like the first through third temperature measuring portions 315, 331, and 333 of FIG. 3, and do not denote specific modules detachable from the aerosol generating device 400.

In detail, the fourth temperature measuring portion 431 denotes a location biased in a positive direction of an x axis from a center of the PCB included in the main body 430, the fifth temperature measuring portion 433 denotes a central location of the main body 430, and the sixth temperature measuring portion 435 denotes a location biased in a negative direction of the x axis from the center of the main body 430.

When the aerosol generating device 400 of FIG. 4 is an ultrasonic vibration aerosol generating device, the temperatures of the fourth through sixth temperature measuring portions 431, 433, and 435 may keep rising, as an accumulated vibration time of an ultrasonic vibrator increases with the repeated puff operations.

TABLE 2

| | Temperature | | |
|---|---|---|---|
| The number of puff operations | 431 Fourth temperature measuring portion | 433 Fifth temperature measuring portion | 435 Sixth temperature measuring portion |
| 1 | 34.8 | 32.8 | 28.6 |
| 2 | 39.5 | 36.1 | 31.1 |
| 3 | 44.7 | 38.4 | 32.9 |
| 4 | 49.1 | 41.7 | 35.1 |
| 5 | 53.3 | 44.0 | 37.1 |
| 6 | 57.2 | 46.3 | 39.0 |
| 7 | 60.0 | 48.0 | 40.6 |
| 8 | 62.1 | 49.6 | 42.1 |
| 9 | 63.0 | 51.5 | 43.6 |
| 10 | 65.7 | 52.9 | 45.0 |
| 11 | 73.9 | 53.7 | 46.3 |

TABLE 2-continued

| The number of puff operations | Temperature | | |
|---|---|---|---|
| | 431 Fourth temperature measuring portion | 433 Fifth temperature measuring portion | 435 Sixth temperature measuring portion |
| 12 | 79.3 | 55.1 | 47.4 |
| 13 | 88.2 | 57.1 | 48.6 |
| 14 | 93.1 | 59.5 | 50.8 |

Table 2 shows temperature values of the fourth through sixth temperature measuring portions 413, 433, and 435, wherein the temperature values are changed as the puff operations are continually performed in FIG. 4. Referring to Table 2, it is shown that the fourth temperature measuring portion 413 may have a temperature rising up to 93.1° C. as the puff operations continue, the fifth temperature measuring portion 433 may have a temperature rising up to 59.5° C., and the sixth temperature measuring portion 435 may have a temperature rising up to 50.8° C.

For example, a processor configured to control various modules of the aerosol generating device 400 may be mounted in the fifth temperature measuring portion 433. As another example, even when a pressure sensor having a recommended temperature range, an upper limit of which is 85, the recommended temperature range as described in Table 1, is mounted in the fifth temperature measuring portion 433 and the sixth temperature measuring portion 435, the pressure sensor may normally operate regardless of the number of puff operations.

Also, to interpret Table 2 assuming that the aerosol generating device 400 is the ultrasonic vibration aerosol generating device, a temperature rise speed of the fourth temperature measuring portion 431, arranged to be most close to an ultrasonic vibrator vibrating at a predetermined frequency, is the highest, and temperature rise speeds of the fifth temperature measuring portion 433 and the sixth temperature measuring portion 435 that are relatively apart from the location of the ultrasonic vibrator by a predetermined distance are relatively low. In particular, since the sixth temperature measuring portion 435 is farthest from the fourth temperature measuring portion 431 in a negative direction of an x axis, a temperature rise value of the sixth temperature measuring portion 435 is the least, as the puff operations continue.

To interpret FIGS. 3 and 4 in a combined way, it is identified that a temperature rise speed according to an increase in the number of puff operations increases, as a location in an ultrasonic vibration aerosol generating device is closer to an ultrasonic vibrator or a vibration receiver receiving vibration of the ultrasonic vibrator. For example, the temperature rise speed of the first temperature measuring portion 315 is the highest, and the temperature rise speed of the sixth temperature measuring portion 435 is the lowest.

Also, even when a distance from the location in which vibration occurs is the same, temperature rise speeds of locations may be different, according to the characteristics of a device mounted in the corresponding locations or effects from other devices mounted on a PCB. For example, it is described above with reference to Table 1 that although the second and third temperature measuring portions 331 and 333 are apart from the first temperature measuring portion 315 by the same distance, they have different temperature rise speeds from each other.

Based on the experimental and empirical resources described above, embodiments provide an aerosol generating device characterized by having device arrangement, whereby devices having the recommended temperature range, an upper limit of which is 50° C. to 100° C., may normally operate. According to the embodiments, occurrence of a malfunction due to overheating is significantly lower, compared to the previous aerosol generating device operating with a single PCB, as described with reference to FIGS. 3 and 4.

FIG. 5 is a schematic diagram of an internal structure of an aerosol generating device according to embodiments.

The aerosol generating device according to embodiments may include a housing 500 illustrated in FIG. 5 and a cartridge that are coupled to each other. The cartridge may be coupled to an end of the housing 500 of FIG. 5 or, according to an embodiment, may be included in the housing 500 of FIG. 5. For example, FIG. 5 illustrates an aerosol generating device in detail, except for a cartridge.

The housing 500 forms an exterior shape such that various modules may be mounted inside or the outside the housing 500. A cavity may be defined in the housing 500 so that various modules required for an operation of the aerosol generating device may be mounted. At least two PCBs may be mounted in the housing 500.

A first PCB 510 may be mounted on an inner surface of the housing 500. Referring to FIG. 5, the first PCB 510 may be mounted on an inner surface 500*a* of the housing 500, the inner surface 500*a* extending in parallel to a plane formed by an x axis and a y axis. In FIG. 5, the inner surface 500*a* of the housing 500 may correspond to a surface facing another inner surface 500*b* of the housing 500, the other inner surface 500*b* being illustrated as a cover of the housing 500.

A second PCB 520 may be mounted to extend in a direction crossing an extension direction of the surface of the housing 500, on which the first PCB 510 is mounted. For example, as illustrated in FIG. 5, the second PCB 520 may be mounted to protrude in a positive direction of a z axis, as a direction perpendicular to the surface of the housing 500, on which the first PCB 510 is mounted. According to an embodiment, when the surface on which the first PCB 510 is mounted is a plane of a direction different from the direction of the plane illustrated in FIG. 5, a direction in which the second PCB 520 is mounted may be different from the direction illustrated in FIG. 5.

A processor 521 configured to generate a control signal and transmit the control signal to various modules in the housing 500 may be mounted on the second PCB 520.

As illustrated in FIG. 5, when the first PCB 510 and the second PCB 520 are mounted in directions perpendicular to each other, effects of conductive heat, convective heat, and radiant heat occurring in the first PCB 510 and the second PCB 520 may not be exponentially accumulated and may be distributed, and thus, a temperature inside the housing 500 and temperatures of devices mounted on PCBs mounted in the housing 500 may be prevented from radically rising.

Also, by appropriately limiting types of devices mounted on the first PCB 510 and the second PCB 520 according to the characteristics of the devices mounted on the first PCB 510 and the second PCB 520 or effectively arranging various modules around the first and second PCBs 510 and 520, the temperature inside the housing 500 and the temperatures of the devices mounted on the PCBs mounted in the housing 500 may be prevented from radically rising.

Next, a bracket 530 may be arranged to extend in a longitudinal direction of the second PCB 520 to be supported by another inner surface of the housing 500, thereby maintaining a location of the second PCB 520 in the housing 500.

Here, the surface by which the bracket is supported denotes a different surface from the surface on which the first PCB 510 is mounted. For example, when the housing 500 has a cuboid shape, the surface supporting the bracket 530 may be any one of remaining five surfaces except for the surface 500*a* on which the first PCB 510 is mounted.

According to an embodiment, the bracket 530 may include at least one bracket. Also, the bracket 530 may include a support coupled to an end of the second PCB 520, and according to an embodiment, the support may be a portion including a concave portion formed in any one of the bracket 530 and the second PCB 520. The other of the bracket 530 and the second PCB 520 may be inserted into the concave portion, and FIG. 5 illustrates an example in which a concave portion 530*a* is included in the bracket 530, and thus, an end of the second PCB 520 is coupled to the concave portion 530*a*. Although not illustrated in FIG. 5, according to an embodiment, a concave portion may be included in the second PCB 520, and the bracket 530 may be coupled to the concave portion formed in the second PCB 520. The concave portion 530*a* formed in the bracket 530 is described in detail with reference to FIG. 7.

An air sensing microphone (MIC) 540 may be mounted on an external side surface of the housing 500 and may be configured to sense a change in air flow outside or inside the housing 500 and transmit a result of the sensing to a processor of the second PCB 520. As illustrated in FIG. 5, the air sensing MIC 540 may be electrically connected to the second PCB 520 while being apart from the second PCB 520 by a predetermined distance.

FIG. 5 illustrates a connector 561 electrically connecting the air sensing MIC 540 with the second PCB 520. However, a device electrically connecting the air sensing MIC 540 with the second PCB 520 is not limited thereto. To form a predetermined distance between the air sensing MIC 540 and the second PCB 520 is to prevent a malfunction of the air sensing MIC 540 due to effects of heat generated in the second PCB 520.

According to another embodiment, although not illustrated in FIG. 5, a heat pipe formed of a thermal conductive material and including a refrigerant therein may be mounted in the housing 500. The heat pipe may be realized by inserting a small amount of water or a Freon-based refrigerant into a hollow pipe formed of a thermal conductive material and kept in a vacuum state. The heat pipe may be mounted between the air sensing MIC 540 and the second PCB 520 and may interfere with heat transfer to the air sensing MIC 540.

A charging module 550 may be mounted on the first PCB 510 and may charge a battery 570 of the housing 500. When a charging connector 550*a* from the outside is connected to the charging module 550, the charging module 550 may perform a function of charging the battery 570 included in the housing 500, and a type of the charging connector 550*a* may be one of various types, such as a universal serial bus (USB) type, a C type, a micro 5 pin type, etc. FIG. 5 illustrates arrangement of the battery 570, according to an embodiment, and a location of the housing 500, in which the battery 570 is arranged is not limited to a particular location.

According to an embodiment, when an aerosol generating device according to embodiments is realized as an ultrasonic vibration aerosol generating device, the charging module 550 and the processor 521 may be arranged on the first PCB 510 and the second PCB 520, respectively, and the first PCB 510 and the second PCB 520 may be mounted in perpendicular directions to each other, so that thermal distribution effects may be generated. In particular, the thermal distribution effects described above may prevent an ultrasonic vibrator receiving power through a pogo pin and vibrating from being damaged due to unnecessary heat applied to the ultrasonic vibrator.

When an input portion 590 configured to receive a user input is provided in the housing 500, a flexible PCB (FPCB) 560 may electrically connect the input portion 590 with the second PCB 520. In FIG. 5, the input portion 590 may be mounted on a surface opposite to (or facing) a surface of a main body, on which the air sensing MIC 540 is mounted.

The FPCB 560 may electrically connect the input portion 590 with the second PCB 520 and may also maintain a location of the bracket 530 to be stable. That is, because the bracket 530 performs the function of maintaining a location of the second PCB 520, the FPCB 560 maintaining the location of the bracket 530 to be stable may in-directly contribute to stably maintaining the location of the second PCB 520.

A substrate support 580 is a member configured to stably support the second PCB 520 mounted in a positive direction of a z axis in FIG. 5 and may be realized to have various shapes. A function of the substrate support 580 is described in detail with reference to FIG. 6.

An opening 599 may be formed at a side of the housing 500. Although not illustrated in FIG. 5, the cartridge coupled to the housing 500 may be coupled to the housing 500 through the opening 599 so as to be electrically connected with the processor and the battery in the housing 500.

FIG. 6 is a view for describing an arrangement of the first PCB and the second PCB.

FIG. 6 is a view for describing in detail the characteristics of the relative arrangement of the first PCB 510 and the second PCB 520 described with reference to FIG. 5. For convenience of explanation, some of the modules mounted in the housing 500 are omitted, and hereinafter, FIG. 6 is described with reference to FIG. 5.

The first PCB 510 may be mounted on the inner surface 500*a* of the housing 500.

The second PCB 520 may be mounted to extend (or protrude) in a direction crossing a direction in which the surface of the housing 500, on which the first PCB 510 is mounted, extends. For example, as illustrated in FIG. 6, the second PCB 520 may be mounted to extend in a positive direction of a z axis, which is the direction perpendicular to a plane formed by an x axis and a y axis.

FIG. 6 illustrates as if the first PCB 510 and the second PCB 520 physically contact each other. However, according to an embodiment, the second PCB 520 may be mounted to be apart from the first PCB 510 by a predetermined distance. Also, FIG. 6 illustrates an embodiment, in which the second PCB 520 contacts the surface 500*b* facing the inner surface 500*a* of the housing 500. However, according to an embodiment, the second PCB 520 may not contact the surface 500*b* facing the inner surface 500*a* of the housing 500.

In FIG. 6, the bracket 530 may fix an end of the second PCB 520 mounted to stand in the positive direction of the z axis, which is the direction perpendicular to the plane formed by the x axis and the y axis, to increase the stability of the mounting state of the second PCB 520. The bracket 530 may include a concave portion to accommodate an end of the second PCB 620, and the concave portion is described below with reference to FIG. 7.

The substrate support 580 is a member to support the second PCB 520, when the second PCB 520 is mounted in a direction perpendicular to a direction in which the first PCB 510 is mounted. According to an embodiment, the substrate support 580 may be mounted on the first PCB 510 and electrically connected with the charging module 550.

Although not illustrated in FIG. 6, the substrate support 580 may additionally include a terminal (a socket) which may be electrically connected with the charging module 550 and may function as a medium configured to transfer power supplied by the charging module 550 to a battery included in the housing 500 to charge the battery.

The substrate support 580 may be mounted on the first PCB 510 to physically support the second PCB 520, and may at the same time function as a multi-functional element, by being organizationally connected with the charging module 550 to engage in charging of the battery.

FIG. 7 is a view for describing the bracket of FIG. 5 in detail.

In FIG. 7, for convenience of explanation, components except for the bracket 530 and the FPCB 560 are omitted, from among various modules included in the housing 500 of FIG. 5. Hereinafter, FIG. 7 is described with reference to FIG. 5.

The bracket 530 may include a concave portion **530*a* configured to effectively support an end of the second PCB 520. As illustrated in FIGS. 5 and 7, the concave portion 530*a* may denote a portion of the bracket 530, the portion being concavely dented to accommodate at least a portion of the end of the second PCB 520**.

While the first PCB 510 is mounted on a surface of the housing 500 and thus is stable, the second PCB 520 is mounted to stand in a vertical direction of the surface of the housing 500, on which the first PCB 510 is mounted, for thermal distribution effects, and is not fixed to an inner wall of the housing 500. Thus, the second PCB 520 has a relatively more unstable state, compared with the first PCB 510.

In order to increase the stability of the mounting state of the second PCB 520, the substrate support 580 described with reference to FIG. 6 may be mounted on the first PCB 510, or as another method, the bracket 530 may further include the concave portion **530*a*. The concave portion 530*a* may accommodate an end of the second PCB 520 to minimize an arbitrary change of the mounting state of the second PCB 520**.

The bracket 530 may be supported by another inner surface of the housing 500 by using a bracket support **530*b*. The bracket support 530*b* indicates a portion of an uppermost end of the bracket 530, the portion having a predetermined width. Also, as illustrated in FIG. 6, for the bracket 530 to be supported by the other inner surface of the housing 500, the bracket support 530*b* may be formed to have a length having a predetermined ratio with respect to a length of the other inner surface in an x axis direction. Here, the other inner surface of the housing 500 denotes a different surface from the inner surface 500*a* of the housing 500, on which the first PCB 510** is mounted.

The FPCB 560 performs a function of electrically connecting the input portion 590 mounted outside the housing 500 with the second PCB 520. The FPCB 560 may contact at least a portion of the bracket 530 and may electrically connect the input portion 590 with the second PCB 520, as illustrated in each of FIGS. 6 and 7.

FIG. 8 is a view of an example of a pressure sensor.

For convenience, FIG. 8 is described with reference to FIG. 5.

According to embodiments, the housing 500 may include the air sensing MIC 540 to sense a change in air flow, and to replace the air sensing MIC 540, or regardless of the air sensing MIC 540, may further separately include a pressure sensor. The pressure sensor may sense a change in pressure and transmit a sensing result to a processor operating by being mounted on the second PCB 520.

The pressure sensor has a relatively lower upper limit of a recommended temperature range, compared to other modules, and may operate by being mounted on the first PCB 510. As another example, the pressure sensor 810 may include a first portion 811 including a single chip and a second portion 812 including a plurality of passive devices, wherein the first portion 811 and the second portion 812 may operate by being mounted on different PCBs.

In detail, FIG. 8 is a view of an example of the pressure sensor 810 including the first portion 811 and the second portion 812.

In FIG. 8, the pressure sensor 810 may include the first portion 811 including a single chip (or a system on a chip (SoC)) and a remaining portion (the second portion) except for the first portion. The first portion 811 of the pressure sensor 810 has the characteristics that the first portion 811 may normally operate at a relatively low temperature. The second portion 812 includes the passive devices including a resistor, a capacitor, etc. and has the characteristics that the second portion 812 may normally operate at a relatively higher temperature than the first portion 811

As illustrated in FIG. 8, the first portion 811 of the pressure sensor 810 may be mounted on the first PCB 510, and the second portion 812 may be mounted on the second PCB 520. Because the first portion 811 of the pressure sensor 810, which is relatively vulnerable to heat, may be mounted on the first PCB 510, and the second portion 812 of the pressure sensor 810, which has good thermal resistance, may be mounted on the second PCB 520, a malfunction of the pressure sensor 810 due to overheating may be prevented.

According to embodiments, the number of PCBs included in a main body may be increased to a plurality and various modules may be arranged in an optimized way based on the increased number of PCBs, to prevent a phenomenon, in which a temperature inside an aerosol generating device rises to an extremely high level to cause a malfunction of a device having low thermal resistance.

Those of ordinary skill in the art related to this embodiment understand that it may be implemented in a modified form without departing from the scope of the disclosure. Therefore, the embodiments of the disclosure should be considered as illustrative examples only, and should not be construed as limiting the scope of the disclosure. The scope of the present disclosure is described in the claims rather than the foregoing description, and any modifications, substitutions and improvements of the embodiments of the disclosure should be construed as being included in the present disclosure.

The invention claimed is:

1. An aerosol generating device comprising:

a housing;

a first printed circuit board arranged to extend along one surface of the housing;

a second printed circuit board arranged in the housing, and on which a processor configured to generate a control signal is mounted, the second printed circuit board extending in a direction crossing a direction in which the one surface of the housing extends, and a battery arranged in the housing, one side of the battery facing the second printed circuit board, wherein the housing further comprises an input portion at an external side surface, the input portion being configured to receive a user input and facing other side of the battery which is opposite to the one side of the battery, the input portion is electrically connected to the second printed circuit board through a flexible printed circuit board (FPCB) arranged in the housing, the flexible printed circuit board extending from the input portion to the second printed circuit board by passing over the battery.

2. The aerosol generating device of claim 1, further comprising at least one bracket supported by another surface in the housing and maintaining a location of the second printed circuit board.

3. The aerosol generating device of claim 2, wherein the at least one bracket comprises a support coupled to an end of the second printed circuit board.

4. The aerosol generating device of claim 3, wherein the support comprises a concave portion formed in any one of the at least one bracket and the second printed circuit board, and the other one of the at least one bracket and the second printed circuit board is inserted into the concave portion.

5. The aerosol generating device of claim 1, wherein one end of the flexible printed circuit board is bent and electrically connected to the input portion.

6. The aerosol generating device of claim 1, wherein the other end of the flexible printed circuit board at least is bent and electrically connected to the second printed circuit board.

7. The aerosol generating device of claim 1, further comprising an air sensing microphone (air sensing MIC) arranged in the housing, wherein the air sensing microphone is electrically connected to the second printed circuit board.

8. The aerosol generating device of claim 1, further comprising a charging circuit mounted on the first printed circuit board and electrically connected to a charging connector, the charging circuit configured to receive external power through the charging connector to charge the battery.

9. The aerosol generating device of claim 1, further comprising a pressure sensor mounted on the first printed circuit board and configured to sense a pressure change.

10. The aerosol generating device of claim 1, further comprising a pressure sensor separately mounted on the first printed circuit board and the second printed circuit board and configured to sense a pressure change, wherein the pressure sensor comprises:

a first portion mounted on the first printed circuit board and including a single chip; and a second portion mounted on the second printed circuit board and including at least one passive device.

11. The aerosol generating device of claim 1, further comprising:

an ultrasonic vibrator mounted in the housing and configured to vibrate at a predetermined frequency according to the control signal of the processor; and a cartridge coupled to the housing, wherein the cartridge comprises:

a storage configured to store an aerosol generating material; and a material transfer portion configured to absorb the aerosol generating material of the storage and vibrate due to vibration of the ultrasonic vibrator so as to convert the aerosol generating material into an aerosol.

12. The aerosol generating device of claim 1, further comprising a cartridge coupled to the housing, wherein the cartridge comprises:

an ultrasonic vibrator mounted in the cartridge and configured to vibrate at a predetermined frequency according to the control signal of the processor;

a storage configured to store an aerosol generating material; and a material transfer portion configured to absorb the aerosol generating material of the storage and vibrate due to vibration of the ultrasonic vibrator so as to convert the aerosol generating material into an aerosol.

* * * * *